Patented Feb. 2, 1943

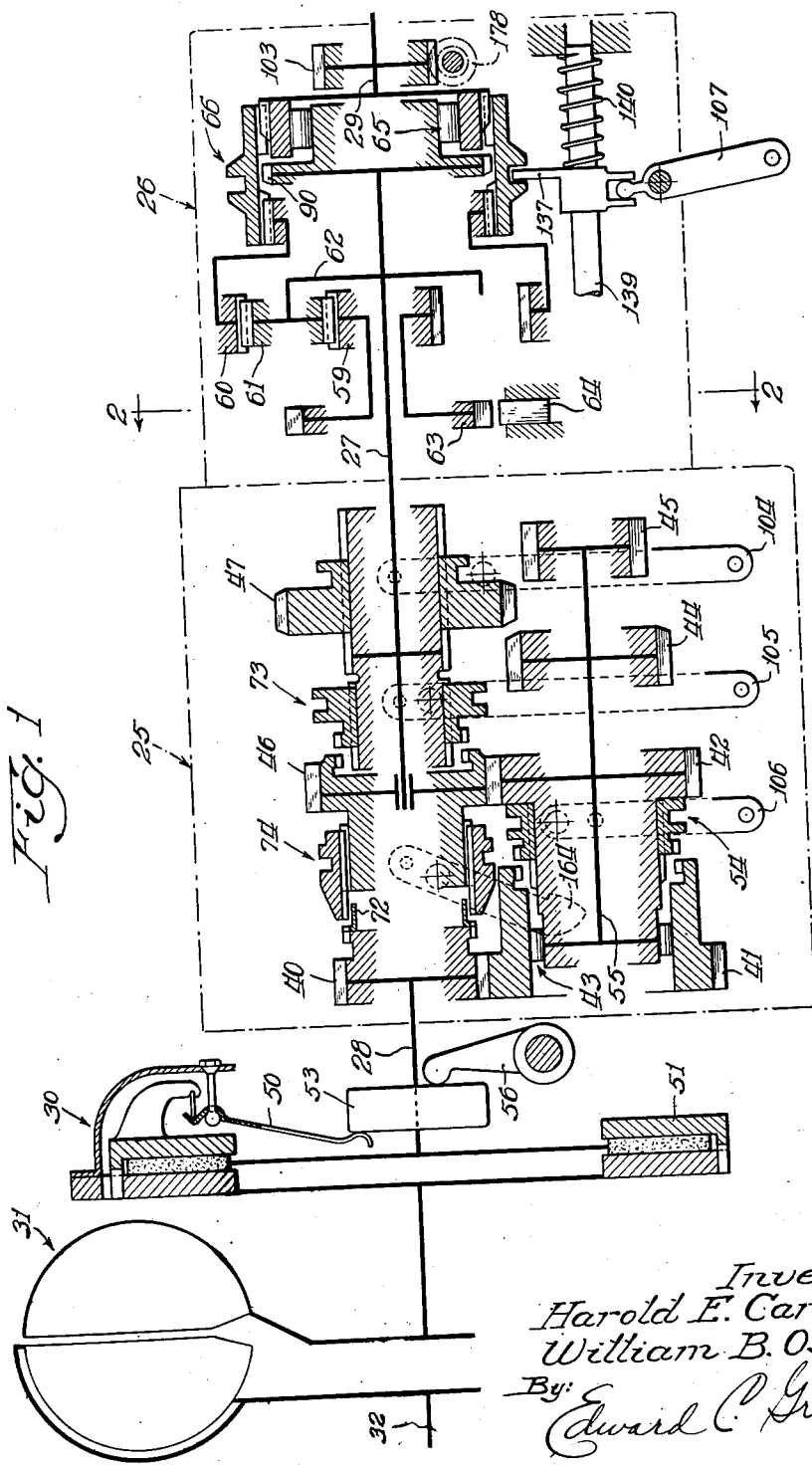

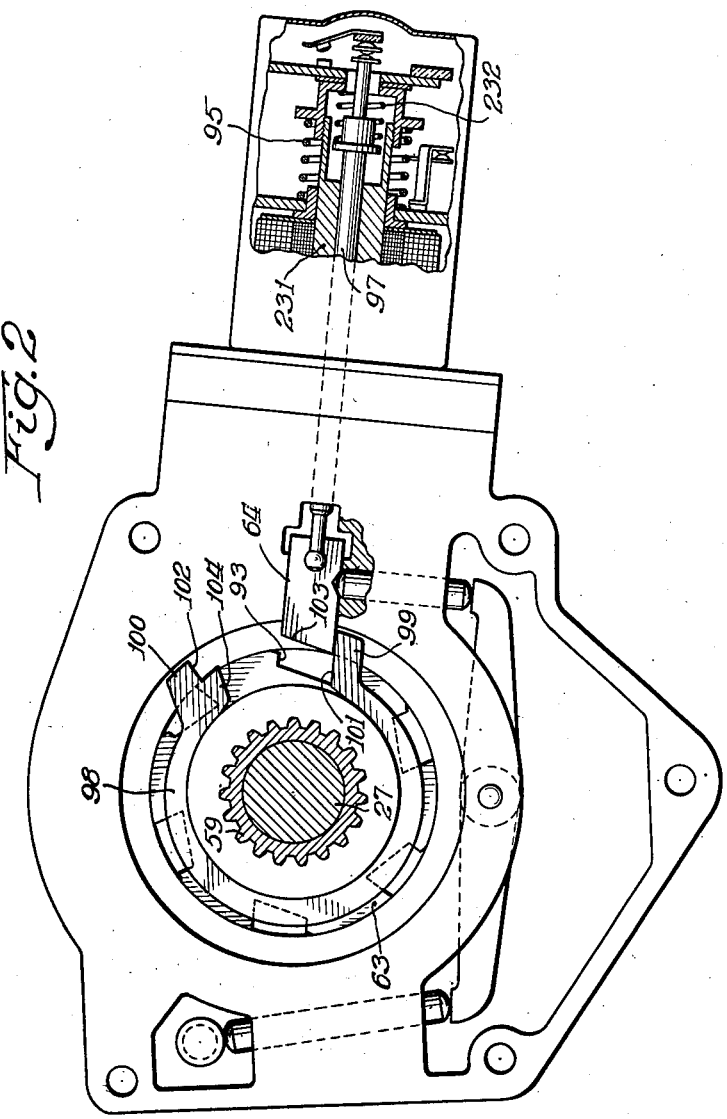

2,309,826

UNITED STATES PATENT OFFICE 2,309,826

AUTOMATIC TRANSMISSION AND CONTROL SYSTEM THEREFOR

Harold E. Carnagua and William B. Osborne, Muncie, Ind., assignors to Borg-Warner Corporation, Chicago, Ill., a corporation of Illinois Application July 28, 1941, Serial No. 404,286

7 Claims. (Cl. 74—328)

This invention relates to transmissions having positively interengageable elements for effecting changes in speed ratio therethrough. For purposes of illustration, it will be described with reference to a planetary transmission, but it is to be understood that the invention involved is of wider application.

It has been proposed to combine a planetary change speed mechanism with a countershaft change speed mechanism to provide a multi-speed transmission for use in automotive vehicles. It has been proposed further in connection with such a transmission to effect at least one of the shifts in each of the individual transmissions automatically and to coordinate the automatic shifts in such a manner as to secure three automatically operable forward speed ratios. Such a transmission is described in detail in a co-pending application of J. M. Simpson and Harold E. Carnagua, Serial No. 403,196, filed July 19, 1941. In the transmission referred to, it is contemplated that the automatic shift in each unit will be effected by means of positively interengageable elements which are automatically controlled by the combined action of a speed-responsive device and an accelerator pedal or other manual control. Provision is made in the automatic control for having both positively interengageable shift elements conditioned for operation at the same time, within a predetermined speed range. To differentiate between the shifts, however, so as to enable the operator to select which of the two shifts shall be operable, it is further contemplated in the transmission referred to that one of the positively interengageable elements will operate much more quickly than the other, this being accomplished by causing one of the elements to be dependent upon a torque reversal for its operation and the other to be independent of torque reversal.

An object of this invention is to provide a means, in a transmission of the type described above, for rendering one of the positively interengageable elements independent of torque reversal during such times as it is expected to be operated.

Another object of this invention is to provide, in a transmission of the type described, a pair of interengageable elements which may be operated under two different conditions, one of which requires a torque reversal for the engagement of the element and the other of which permits the operation of the elements without a reversal of torque.

Another object of this invention is to provide a planetary transmission having positively interengageable elements for arresting the rotation of the sun gear of the planetary transmission and a balk ring which under one set of conditions does not interfere with the operation of the positively interengageable elements and under another set of conditions prevents the operation of the elements until a reversal in the direction of rotation of one of the elements with respect to the other takes place.

These and other objects of this invention will become apparent from the following description when taken together with the accompanying drawings, in which:

Fig. 1 is a schematic elevation in section of a transmission embodying the features of this invention; and Fig. 2 is a section through a planetary transmission taken along lines corresponding to 2—2 of Fig. 1, showing the details of one of the automatically operable positively interengageable elements.

For convenience, this invention will be described with reference to a combined planetary and countershaft type of transmission wherein the planetary is an overdrive of the type disclosed in a co-pending application of Harold E. Carnagua, Serial No. 309,718, filed December 18, 1939.

Referring now to Fig. 1 for a brief description of the transmission as a whole, a countershaft type unit is shown at 25 connected to a planetary type of overdrive unit 26 through an intermediate shaft 27. Countershaft unit 25 is connected to an input shaft 28 through a releasable friction clutch 30 of the type commonly used in automotive vehicles, and clutch 30 is in turn connected, by means of a hydraulic coupling 31, to the crankshaft 32 of an internal combustion engine (not shown). Power from shaft 32 is transmitted, after modification by the countershaft and planetary units, to an output shaft 29.

Clutch 30 is operated by means of a clutch release collar 53 which cooperates with the usual fingers 50 operating on a pressure plate 51 to release the clutch. A manually controlled clutch release lever 56 operates clutch release collar 53.

Countershaft unit 25 is comprised of an input gear 40 meshing with a gear 41 connected to a countershaft 55 through an overrunning clutch 43, said countershaft being adapted to drive a second speed gear 42, a first speed gear 44, and a reverse gear 45. Slidably splined to intermediate shaft 27 are a gear 47 and a jaw clutch 73. A gear 46 is loosely mounted on intermediate shaft 27, said gear being in constant mesh with second speed gear 42. A jaw clutch 74 is adapted to connect input gear 40 directly with gear 46. A blocker 72 of any suitable character is interposed between jaw clutch 74 and gear 40 to render the engagement of jaw clutch 74 dependent upon a reversal of torque between gear 40 and gear 46. A jaw clutch 54 on countershaft 55 serves to connect gear 41 directly to the countershaft around overrunning clutch 43.

Slidable gear 47 is controlled by a lever 104, jaw clutch 73 is controlled by a lever 105, lock-up clutch 54 is controlled by a lever 106, and jaw clutch 74 is controlled by a lever 164.

The speed ratios which may be established through the countershaft transmission 25 are as follows:

With the clutches and slidable gear 47 in the position shown, the transmission is conditioned for neutral. When gear 47 is slid to the right (Fig. 1) an idler gear (not shown) is engaged by gear 47 and a reverse drive is established from gear 40 to gear 41, overrunning clutch 43, countershaft 55, gear 45, the reverse idler, and sliding gear 47. When said sliding gear 47 is moved to the left (Fig. 1) to engage gear 44, low speed drive is established from input gear 40 to gear 41, overrunning clutch 43, countershaft 55, low speed gear 44, and slidable gear 47. When jaw clutch 73 is moved to engage gear 46, sliding gear 47 being in its neutral position, a second speed drive is established from input gear 40, gear 41, overrunning clutch 43, second speed gear 42, gear 46, clutch 73, and intermediate shaft 27. When jaw clutch 74 is moved to the left (Fig. 1) to engage gear 40 a direct drive is then established from input gear 40 through clutch 74, gear 46 through clutch 73, the latter having been maintained in engaged position with respect to gear 46, to intermediate shaft 27.

The planetary unit 26 is comprised of a sun gear 59, a ring gear 60, and a plurality of pinions 61 which engage sun gear 59 and ring gear 60. Planet pinions 61 are mounted on a carrier 62 which is rotatable with intermediate shaft 27. Sun gear 59 is connected to and rotatable with a slotted element 63 which is adapted to be engaged by a slidable pawl 64 to arrest the rotation of the sun gear 59. Ring gear 60 is connected through a jaw clutch 66 to output shaft 29. An overrunning clutch 65 provides a releasable connection between intermediate shaft 27 and output shaft 29. Jaw clutch 66 may be made to assume a position wherein it engages teeth 90 on intermediate shaft 27 and provides a direct connection between intermediate shaft 27 and output shaft 29 around overrunning clutch 65. Jaw clutch 66 is controlled by a slidable yoke 137 which is mounted on a rod 139 and controlled by a pivoted lever 107. A spring 140 normally biases slidable yoke 137 to a position which releases the positive connection between intermediate shaft 27 and output shaft 29.

The speeds which may be established through planetary unit 26 are as follows: When pawl 64 is withdrawn from slotted element 63 as shown in Fig. 1 and jaw clutch 66 is positioned to release the positive connection around overrunning clutch 65, a direct speed is established between shafts 27 and 29 through overrunning clutch 65. When pawl 64 is engaged with slotted element 63 so as to arrest the rotation of sun gear 59, an overdrive is established through carrier 62, planet pinions 61, ring gear 60 and clutch 66, to output shaft 29.

A speedometer drive gear 103 mounted on output shaft 29 serves also as a drive for a governor 178 which controls the automatic operation of pawl 64 and lever 164 in the manner described in the aforementioned application of Simpson and Carnagua.

It is intended that within a predetermined speed range it will be possible to condition both jaw clutch 74 and pawl 64 for operation and that pawl 64 will operate more quickly than jaw clutch 74 to enable the operator to obtain an overdrive second speed ratio.

Referring now to Fig. 2, for details of the pawl 64 and its associated mechanism, it will be observed that pawl 64 is connected by means of a rod 97 and a spring 232 to an armature 231 which is normally biased by a spring 95 to an outward position, that is, to a position which causes pawl 64 to be withdrawn from the slotted element 63. Said element 63 is provided with radial slots 93 which are adapted to receive the end of pawl 64. Frictionally engaging element 63 is a balk ring 98 which is provided with spaced lugs 99 and 100. Said lugs have faces 101 and 102, respectively, which are adapted to engage opposite sides of pawl 64. The direction of rotation of element 63 with respect to pawl 64 determines which face, 101 or 102, will engage pawl 64. As viewed in Fig. 2, the normal direction of rotation of intermediate shaft 27 is counterclockwise, and when direct drive is established through planetary unit 26, the sun gear 59 and slotted element 63 also rotate counterclockwise. This causes the balk ring 98 to rotate counterclockwise and thereby engage face 101 with pawl 64. When balk ring 98 so engages pawl 64, its rotation is of course arrested and it thereafter simply drags frictionally along its contacting surface on slotted element 63. It will be observed that the end 103 of pawl 64 is chamfered in a direction to assist the engagement of pawl 64 with a slot 93 when the direction of rotation of the slotted element 63 is counterclockwise. It will be observed further that there is no obstruction on surface 101 of lug 99 to prevent the entry of pawl 64 into a slot 93, and accordingly, if armature 231 is urged radially inward, pawl 64 will engage slot 93 immediately. The engagement will take place without a reversal of torque, and for this reason will be quite rapid.

Due to the fact that carrier 62 is the driving member during normal operation of the transmission and ring gear 60 is connected to the load, when crank shaft 32 is decelerated, as for example by closing the throttle of the engine, carrier 62 will begin to slow down with respect to ring gear 60. Sun gear 59 will slow down likewise, but at a much more rapid rate, and will eventually stop and begin to rotate in the opposite direction (clockwise in Fig. 2) even though carrier 62 is still rotating counterclockwise. This means that if the engagement of pawl 64 with the slot 93 is delayed beyond the point where sun gear 59 is stationary, pawl 64 will then ratchet over slots 93. This of course would result in an undesirable noise and would prevent the engagement of pawl 64 with slotted element 63. To avoid the unpleasant noise, lug 100 is provided with a shoulder 104 which is adapted to be interposed into the path of movement of pawl so as to prevent the latter from ratcheting over slot 93. The tendency to ratchet occurs only when rotation of slotted element 63 is in a clockwise direction and such rotation will of course cause balk ring 98 to rotate clockwise along with the slotted element 63, and lug 100 will therefore bear against pawl 64 and thus bring shoulder 104 into the path of movement of pawl 64.

Since in low and second speed the connection between shaft 27 and input shaft 28 is released by overrunning clutch 43 whenever the engine speed is reduced quickly, and furthermore since the connection between shaft 27 and shaft 29 is likewise released through overrunning clutch 65 when the speed of shaft 27 drops below the speed of shaft 29, such shaft 27 becomes what may be termed a "dead" shaft and carries only the inertia of the rotating gears which is relatively small. The engagement of pawl 64 with a slot 93 without a delay until the customary torque reversal takes place does not cause any undesirable shock to be felt. If, on the other hand, the vehicle is coasting at a speed which causes armature 231 to be pulled inward by the automatic mechanism while carrier 62 is rotating at idling speed of the engine and slotted element 63 is therefore rotating clockwise, undue ratcheting is prevented until the operator opens the throttle and drives carrier 62 at an increased speed. While carrier 62 is being accelerated, a critical speed is reached wherein sun gear 59 stops rotating and then begins to rotate in the opposite direction. During this pause in the rotation of the sun gear 59 and the ensuing reversal in direction of rotation, balk ring 98 is oscillated out of the way and pawl 64 then passes through into engagement with a slot 93.

It is understood that the foregoing description is merely illustrative of a preferred embodiment of the invention, and that the scope of the invention is not to be limited thereto, but is to be determined by the appended claims.

We claim:

1. A vehicle drive including a source of power, a transmission connected thereto and comprising input and output shafts, a plurality of gear trains connectible between the shafts to provide different speed ratios therebetween, a jaw clutch for establishing one of the gear trains, positively interengageable means for establishing another gear train, means for conditioning said gear trains for contemporaneous operation, and a blocker interposed between the elements of the jaw clutch for rendering the operation of the clutch subject to torque reversal, said positively interengageable means being chamfered in a direction to render the said positively interengageable means independent of torque reversal at such time and hence faster to operate than the clutch, whereby to enable the operator selectively to control the establishing of the gear trains by controlling the application of power to the transmission.

2. A transmission as described in claim 1, said positively interengageable means comprising a slotted member associated with said other gear train and a slidable pawl adapted to engage the slotted member.

3. A transmission unit comprising sun, planetary and ring gears, a pair of shafts, means for connecting the planetary and ring gears to the shafts, and means for arresting the rotation of the sun gear, said means comprising a slotted element rotatable in unison with the sun gear, a latch movable into engagement with the slotted element, said sun gear being capable of rotation in either direction, means for urging the latch toward engagement with the slotted element, and balk means responsive to movement of the sun gear and adapted to assume two extreme positions, one of which blocks the movement of the latch and the other of which permits the latch to move into engagement with the slotted element to arrest the sun gear, said balk means comprising a ring in frictional contact with the slotted element, and having circumferentially spaced lugs adapted to limit rotation of the movement of the ring with respect to the latch, and a projection extending from one lug, said projection being adapted to prevent engagement of the latch with the slotted element when the said lug is urged toward the latch, and said latch being freely movable into engagement with the slotted element when the other lug is urged toward the latch.

4. A transmission comprising input and output shafts, an intermediate shaft, a gear train connectible between the input shaft and the intermediate shaft, said gear train including an overrunning clutch which is releasable when the intermediate shaft becomes the driver, a positive clutch for connecting the input shaft to the intermediate shaft, an overrunning clutch connecting the intermediate shaft to the output shaft, said last-mentioned clutch being releasable when the output shaft becomes the driver, a planetary gear train connecting said shafts around the last-mentioned overrunning clutch, said planetary gear train including a toothed reaction member, a rotationally fixed member engageable with the toothed member to provide a fixed reaction for the planetary gear train, means for conditioning the jaw clutch and the engageable reaction members for operation to establish different ratios through the transmission, means for preventing engagement of the reaction members, said last-mentioned means being inoperative to prevent such engagement when the input shaft is the driver and the jaw clutch and reaction members are initially conditioned for operation, and a blocker ring on the jaw clutch for rendering the clutch inherently slower to operate than the engageable reaction members, thereby enabling the operator selectively to control the establishing of the gear trains, the overrunning clutches serving to disconnect the intermediate shaft from the other shafts to facilitate engagement of the reaction members quickly substantially without shock.

5. A transmission as described in claim 4, said reaction members comprising a pawl and a slotted member adapted to be engaged by the pawl, and the means for preventing engagement of the reaction members comprising an oscillatable friction ring controlled by movement of the sun gear and having a lug which holds the pawl out of engagement when the output shaft is the driver and a slot which allows the pawl to engage the slotted member when the input shaft is the driver.

6. A reaction device for a transmission having input and output shafts and gearing connecting said shafts, said device comprising a slotted member driven by the gearing and rotatable in the same direction as the input shaft while said input shaft is the driver, a rotationally fixed pawl adapted to engage the slotted member to arrest the rotation of the member to effect a speed change in the transmission, the end of said pawl being chamfered to assist the engagement of the pawl with the slotted member when the slotted member is rotating in the same direction as the input shaft and the input shaft is the driver.

7. A reaction device as described in claim 6, and balk means interposed between the pawl and slotted member, said balk means being ineffective to prevent the pawl from engaging the slotted member when the latter is rotating in the same direction as the input shaft.

HAROLD E. CARNAGUA.
WILLIAM B. OSBORNE.